United States Patent
East

(10) Patent No.: US 9,679,456 B2
(45) Date of Patent: Jun. 13, 2017

(54) SYSTEM AND METHOD FOR TRACKING ASSETS

(71) Applicant: Clark D. East, Clearwater, FL (US)

(72) Inventor: Clark D. East, Clearwater, FL (US)

(73) Assignee: Tracfind, Inc., Clearwater, FL (US)

( * ) Notice: Subject to any disclaimer, the term of this patent is extended or adjusted under 35 U.S.C. 154(b) by 0 days.

(21) Appl. No.: 14/479,958

(22) Filed: Sep. 8, 2014

(65) Prior Publication Data

US 2015/0070165 A1 Mar. 12, 2015

Related U.S. Application Data

(60) Provisional application No. 61/874,466, filed on Sep. 6, 2013.

(51) Int. Cl.
| | | |
|---|---|---|
| *G08B 1/08* | (2006.01) | |
| *G08B 13/24* | (2006.01) | |
| *G08B 21/02* | (2006.01) | |

(52) U.S. Cl.
CPC ...... *G08B 13/2462* (2013.01); *G08B 13/2482* (2013.01); *G08B 21/0272* (2013.01); *G08B 21/0275* (2013.01)

(58) Field of Classification Search
CPC  G08B 13/2462; G08B 13/1965; G08B 13/14; G08B 13/1427; G08B 13/1436; G08B 13/2482; G08B 21/0269; G08B 21/0213; G08B 21/0261; G08B 21/0263; G08B 21/0272; G08B 21/0275; G08B 21/028; G08B 21/0283; G08B 21/24; G01S 5/0009; G01S 5/0036; G01S 5/0294; G01S 5/0027; G06Q 10/087; G06Q 10/08;
(Continued)

(56) References Cited

U.S. PATENT DOCUMENTS 5,587,715 A * 12/1996 Lewis ............... G01S 19/07
  342/357.24
6,801,853 B2   10/2004 Workman
(Continued)

FOREIGN PATENT DOCUMENTS

EP  2282158 A1  2/2011

OTHER PUBLICATIONS

McCarthy. Feasibility of Installing Global Positioning Systems on Firearms. OLR Research Report. State of Connecticut General Assembly. Office of Legislative Research. 2013-R-0069. Jan. 24, 2013. Date Accessed Nov. 10, 2014. http://www.cga.ct.gov/2013/rpt/2013-R-0069.htm.

(Continued)

*Primary Examiner* — Hoi Lau

(57) ABSTRACT

A computer-based system, computer-implemented method, and computer-readable medium for tracking assets, such as objects and persons. The current invention involves associating a GPS-tracked tag with a targeted asset, registering a serial number associated with the tag, storing the serial number onto a database, and tracking the tag—and thus, associated asset—through the database. Authorized third parties, such as law enforcement personnel, may also access the database and track the asset, if needed, for example if the asset is stolen. The user is able to activate and deactivate the tracking ability of the tag and immediately track the tag when needed.

21 Claims, 14 Drawing Sheets

(58) Field of Classification Search
CPC ... B60R 25/102; B60R 25/33; B60R 25/1025;
B60R 25/1044; B60R 25/04; B60R 25/00;
B60R 25/406; B60R 25/042
USPC ......... 340/572.1, 539.13, 10.1, 573.1, 568.1,
340/539.15, 539.32; 342/357.06, 357.15,
342/357.21, 357.2; 235/385, 375
See application file for complete search history.

(56) References Cited

U.S. PATENT DOCUMENTS

| | | | |
|---|---|---|---|
| 7,398,153 B2 | 7/2008 | Workman et al. | |
| 7,801,506 B2 | 9/2010 | Haave et al. | |
| 7,822,817 B2* | 10/2010 | Motoyama | H04L 67/125 709/206 |
| 7,855,642 B2 | 12/2010 | Veiga, III | |
| 8,452,868 B2 | 5/2013 | Shafer et al. | |
| 8,482,399 B2 | 7/2013 | Breed | |
| 8,487,757 B2 | 7/2013 | Culpepper et al. | |
| 8,814,043 B2 | 8/2014 | Smith et al. | |
| 2001/0048364 A1* | 12/2001 | Kalthoff | G01S 5/0009 340/573.1 |
| 2003/0093187 A1* | 5/2003 | Walker | B64C 13/20 701/1 |
| 2003/0151506 A1* | 8/2003 | Luccketti | G01S 5/0036 340/539.13 |
| 2006/0009238 A1* | 1/2006 | Stanco | G01S 19/17 455/456.2 |
| 2006/0187026 A1* | 8/2006 | Kochis | G06Q 10/08 340/539.13 |
| 2006/0187027 A1* | 8/2006 | Smith | G08G 1/207 340/539.13 |
| 2006/0255935 A1* | 11/2006 | Scalisi | B60R 25/00 340/539.13 |
| 2006/0265123 A1* | 11/2006 | Chon | G01C 21/30 701/533 |
| 2007/0096898 A1* | 5/2007 | Chou | G01S 5/0027 340/539.13 |
| 2007/0203768 A1* | 8/2007 | Adra | G01S 5/0294 340/539.13 |
| 2008/0121690 A1* | 5/2008 | Carani | G01S 5/0027 235/376 |
| 2009/0002188 A1* | 1/2009 | Greenberg | A01K 15/023 340/686.1 |
| 2009/0049408 A1* | 2/2009 | Naaman | G06F 3/0482 715/835 |
| 2009/0085745 A1* | 4/2009 | Gupta | G06Q 10/087 340/572.1 |
| 2009/0309709 A1* | 12/2009 | Bevacqua | B60R 25/102 340/426.18 |
| 2010/0184342 A1* | 7/2010 | Olig | B63J 99/00 440/84 |
| 2010/0225447 A1* | 9/2010 | Adra | G06Q 10/08 340/10.1 |
| 2010/0289644 A1 | 11/2010 | Slavin et al. | |
| 2011/0285535 A1* | 11/2011 | Barwin | G08B 21/24 340/572.1 |
| 2011/0309975 A1 | 12/2011 | Chu | |
| 2012/0109853 A1 | 5/2012 | Culpepper et al. | |
| 2012/0161967 A1* | 6/2012 | Stern | G06K 7/10366 340/572.1 |
| 2013/0150028 A1 | 6/2013 | Akins et al. | |
| 2013/0229274 A1 | 9/2013 | Kumar et al. | |
| 2013/0237204 A1 | 9/2013 | Buck et al. | |
| 2013/0303189 A1* | 11/2013 | Bennett | H04W 12/02 455/456.2 |
| 2014/0084060 A1* | 3/2014 | Jain | G06Q 10/087 235/385 |
| 2014/0224867 A1* | 8/2014 | Werner | G06F 17/30017 235/375 |

OTHER PUBLICATIONS

Weapons Intelligence. 3ARC Weapons Intelligent Tracking System. Date Accessed Nov. 10, 2014. http://www.3arc.com/eu/PersonalTrackers/WeaponsIntelligence/tabid/67/language/en-US/Default.aspx.
Law Enforcement Devices. Portman Security Systems Weapons Intelligent Tracking System. Date Accessed Nov. 10, 2014. http://www.ptm.com.cn/by-industry-law-enforcement.php.

* cited by examiner

SYSTEM AND METHOD FOR TRACKING ASSETS

CROSS REFERENCE TO RELATED APPLICATIONS

This non-provisional application is a continuation of and claims priority to provisional application No, 61/874,466, entitled "System and Method for Tracking Assets", and filed Sep. 6, 2013 by the same inventor, the entirety of which is incorporated herein by reference.

BACKGROUND OF THE INVENTION

1. Field of the Invention

This invention relates, generally, to global positioning systems ("GPS"). More specifically, it relates to operable media and associated software that track location of secured items with an associated tag.

2. Brief Description of the Prior Art

Global positioning system tracking is a method of tracking the exact location of an object. A GPS tracking system, for example, may be placed in a vehicle, on a cell phone, or on special GPS devices, which can either be a fixed or portable unit. GPS works by providing information on exact location. It can also track the movement of a vehicle or person. For example, a GPS tracking system can be used by a company to monitor the route and progress of a delivery truck, and by parents to check on the location of their child, or even to monitor high-valued assets in transit.

GPS chips or tags are well-known in the art, GPS chipsets are utilized to track various objects or persons, including children, electronics, firearms, etc., from an electronic device. The electronic device simply fires a signal through a server to the chipset, and the chipset returns a signal containing its location.

The issue of installing GPS systems on or in firearms has been discussed previously, for example in McCarthy, Kevin E. "Feasibility of Installing Global Positioning Systems on Firearms", OLR Research Report, State of Connecticut General Assembly, Office of Legislative Research, 2013-R-0069 (Jan. 24, 2013). The foregoing publication discusses several patent applications—such as U.S. Patent Pub. No. 2011/0309975 and EPO App. No. EP2282158—and products—such as PORTMAN SECURITY SYSTEMS Weapons Intelligent Tracking System and 3ARC Weapons Intelligent Tracking System—that attempt to resolve this issue. However, the article points out several drawbacks of the existing art, for example ineffective or incomplete tracking, insufficient battery life and the ability to thwart the system by failing to recharge the battery, and privacy concerns.

There are many further drawbacks of current GPS chips as well. One, in particular, is the one-on-one nature of conventional devices, which further contributes to a lack of security and backup mechanisms. For example, if a firearm is stolen and the owner of the firearm is unavailable to track the firearm, then the owner would be unable to retrieve the firearm, and the firearm would remain in the wrong hands, which may lead to further crimes.

Accordingly, what is needed is a more effective system and method of tracking assets and persons with GPS-tracked tags that are capable of being tracked by users and authorized third parties, such as law enforcement. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF DESCRIPTION OF THE DRAWINGS

For a fuller understanding of the invention, reference should be made to the following detailed description, taken in connection with the accompanying drawings, in which:

FIG. 5G is a screenshot of an exemplary user list page according to an embodiment of the current invention.

FIG. 5H is a screenshot of an exemplary device listing page of a user, as accessed by an authorized third party, according to an embodiment of the current invention.

DETAILED DESCRIPTION OF THE PREFERRED EMBODIMENT

Figure 1:
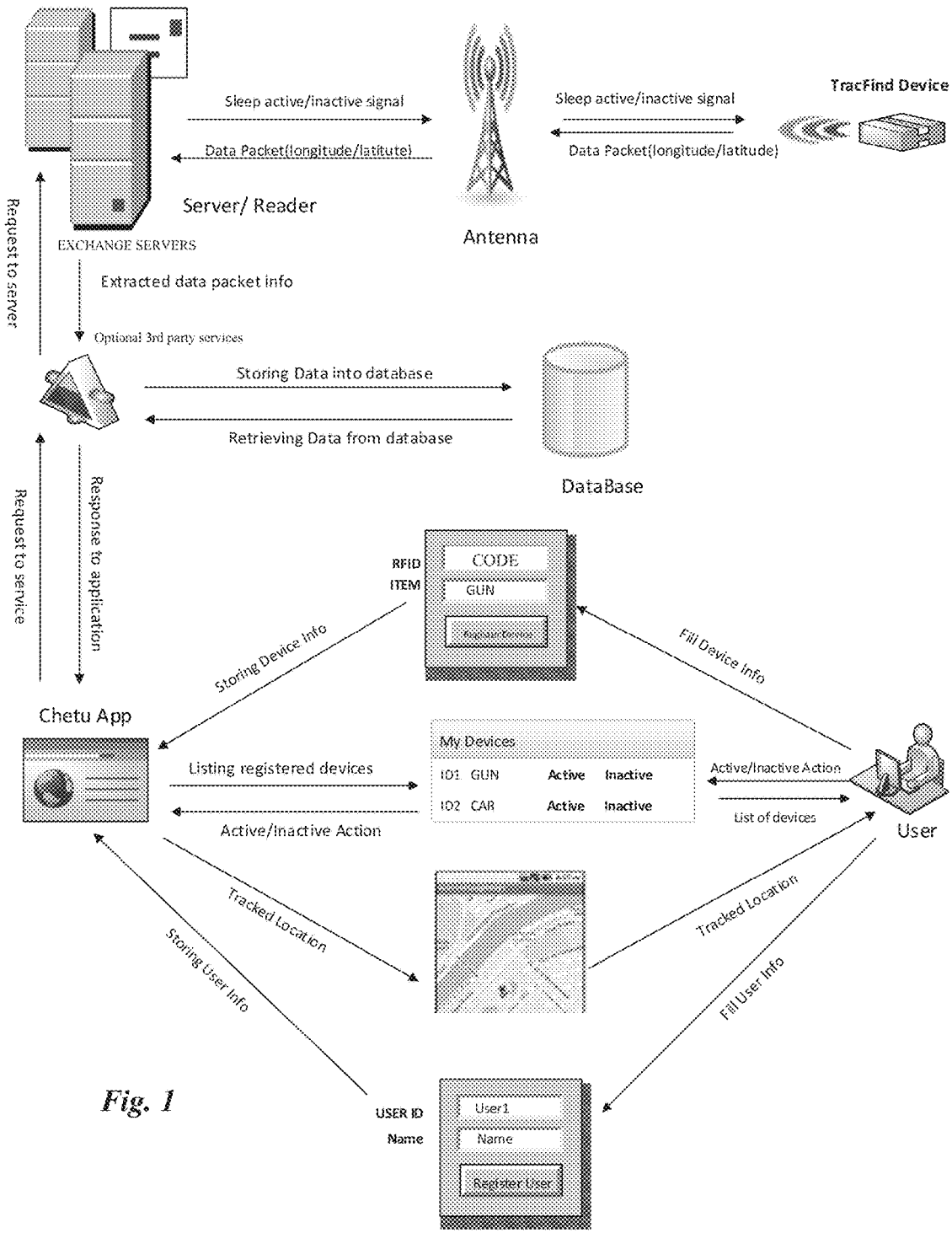
FIG. 1 depicts an architecture for a computer-based application and relationships among the entities according to an embodiment of the current invention.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

The current invention is a software application and associated non-transitory, tangible medium designed to track physical assets and people. The current invention allows a user to track objects and authorized persons leveraging global positioning satellite technology, nanotechnology and generally acceptable embedded software materials and hardware.

In another embodiment, the current invention is a GPS-tracked microchip or tag that can be applied to any fixed or moving object for location tracing. Examples include, but are not limited to, guns, children's backpacks, wallets, cellular phones, computers, televisions, persons, tablets, motorcycles, bicycles, boats, pet collars, senior citizens, remote control for television, clothing, jewelry, cameras, sporting equipment, etc. The GPS-tracked tag is assigned a serial number that is registered by the user on an associated database. At this point, the tag and underlying object is immediately activated on a computer-based application that can be run on any computer-based device (e.g., smart phone, computer, tablet, etc.). Upon activation, the object with GPS-tracked tag is deemed "secured". The application allows the user to instantly track and find the secured object at any time and in any location. The tag is linked to the application, which is linked to a GPS system that can trace, track, and find the secured object to which the tag is attached or otherwise associated.

Characteristics of the current invention include, but are not limited to, portability, compliance with state and federal laws regarding surveillance and telecommunications, waterproof and weatherproof, wide temperature range of operability, leveraging of geo-fencing software, and inability to be detected.

When the software capabilities and GPS-tracked tags are integrated, the application is linked to both a GPS system and the tag. Thus, a user would attach the tag to any movable or stationary item, such as a person (e.g., article of clothing, inside a watch band, key ring, etc.) or tangible Object of any kind (e.g., gun, bicycle, bicycle helmet, wallet, purse, etc.), and the user would enter the serial number assigned to the tag into the application to activate the serial number and associated tag. In an embodiment, the application would further be linked to a web-based application or database accessible by law enforcement personnel. The database would include the serial numbers of all active GPS-tracked tags.

Thus, for example, if an individual goes missing but has a tag according to the current invention present on their person, then not only can a user access the location of the individual, but law enforcement personnel would also be able to access the location immediately, as the first few hours upon disappearance of the individual is the most critical.

As another example, if a personal possession is stolen but has an attached tag according to the current invention, then the user can locate that personal possession immediately by tracking that possession via the database containing the serial number.

As another example, if a student leaves his/her backpack, computer, and/or cellular phone but the article has an attached tag according to the current invention, then the student can input the serial number or associated identification code into the application, and the student can view all tags that the student has registered. A GPS system can then show the student where each article is located.

As another example, if a gun is stolen (the tag can be placed inside the handle or stock of the gun), the gun can be immediately traced by the gun owner or by law enforcement tracking the gun through the database. Not only would this speed up time to recover the gun, but crime could be prevented by locating the gun sooner.

Advantages or objectives of the current invention include (1) a user's ability to create a web-based account and manage one or more secured items; (2) registrability of a secured item based on serial number associated with a GPS-tracked tag that is associated with the secured item; (3) application of statuses to users, such as administrators, customers, law enforcement, etc.; (4) potential applicability for law enforcement personnel to access a user and/or track location of the secured item of the user; (5) ability to track a secured device on a GPS-based chip or tag secured to the device; (6) capability of the GPS-tracked tag to have an adjustable or adaptable active status and sleep mode to extend battery life and to customize user experience; (7) ability of a system to generate and send a wireless signal to the GPS-tracked tag and receive a results packet (latitude/longitude/location) from the GPS-tracked tag for description depiction of location of the tag on a computer-generated map; (8) automated recordability of tracked information saved to a database for future use or consultation; (9) ability for any user to track or look up location of any device or article to which a GPS tag is secured; and (10) universal applicability of a GPS tag on any fixed or moving device or article, such that a stolen device can be tracked and recovered.

EXAMPLES

As seen in FIG. 1, the architecture selected for the computer-based application may be a model-view-controller pattern, though any suitable pattern is envisioned. The application is in communication with the user via user authentication, with the database via an authorized third party, and with the GPS-tracked tag via the server/reader. In operation, upon attaching the tag to a person or device, the user activates the serial number associated with the tag on the application by filling in information about the tag and device to register the tag's serial number, along with information about the user. This device and user information is stored on the application.

When the user wishes to access the GPS-tracked tags and associated devices, the user inputs user information for authentication. A listing of each registered device is outputted to the user. The user can immediately send an activating or deactivating signal to any of the registered tags. The user would input the appropriate command on the application, and the application would send a request to server (optionally via an authorized third party). The activating or deactivating signal is transmitted to the antenna, which subsequently transmits the signal to the tag.

The tag receives the signal, and in return, the tag automatically sends a data packet, containing the latitude, longitude, and other location information of the device, to the antenna, which, in turn, transmits the data packet to the server. The server extracts the data packet information and transmits the extracted information to the database (optionally via an authorized third party). Simultaneously, the data packet information is converted into an appropriate language-based response that is transmitted to the application. The response is displayed to the user over the application in the form of a map or other indication of the location of the tag.

Further, the extracted data packet information stored in the database may be retrieved by authorized parties, such as law enforcement personnel. In this case, the authorized party can also transmit a request to the server for the location of the GPS-tracked tag. Thus, the authorized party can also retrieve location information in real-time.

Figure 2A:
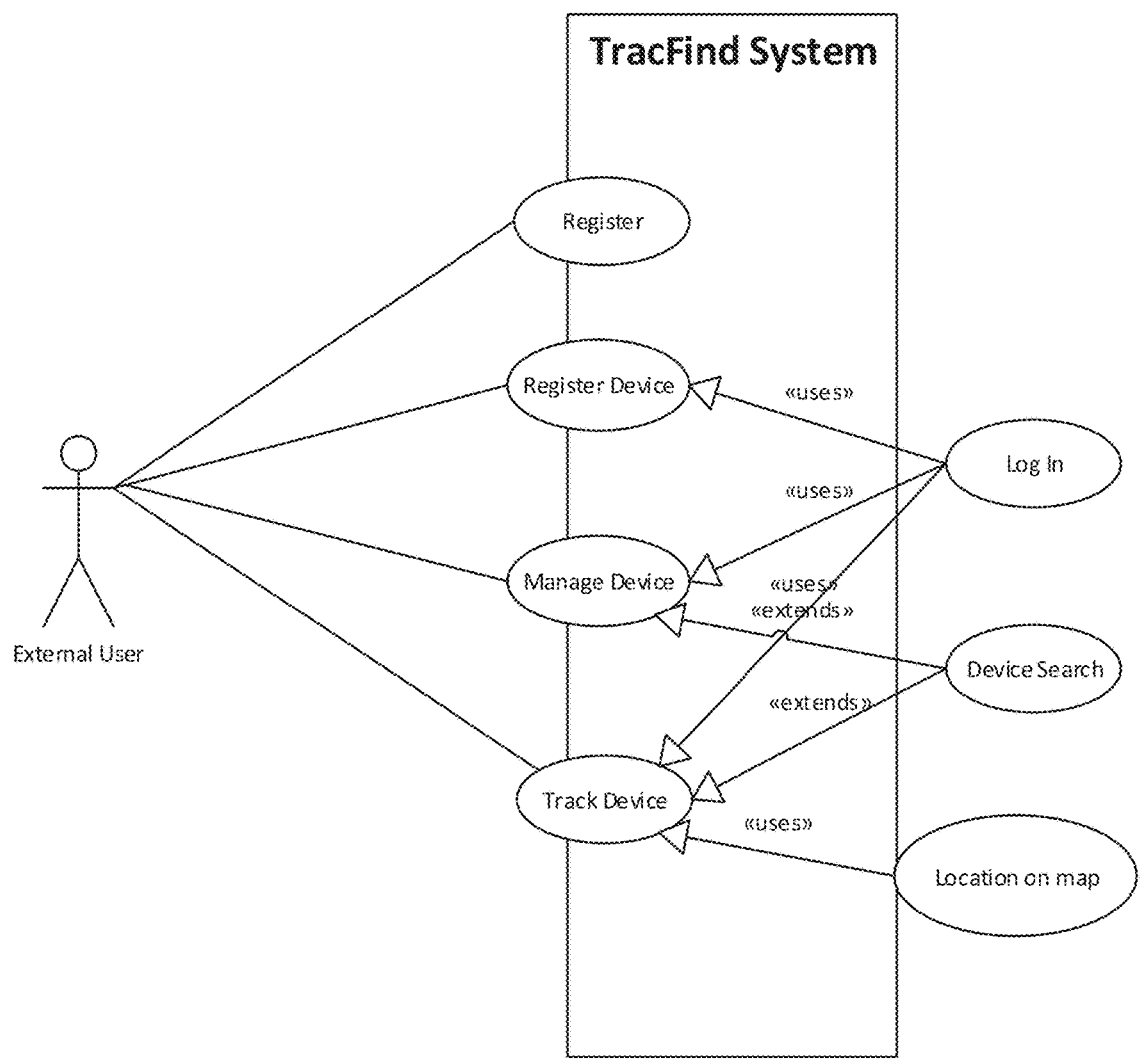
FIG. 2A depicts an interface layer between an external user and an application according to an embodiment of the current invention.

FIG. 2A depicts an interface layer between an external user (as opposed to an internal user, such as an administrator or authorized party, e.g., law enforcement) and the computer-based application. Once the external user is registered (i.e., user information inputted and stored), the user can register a device (with attached GPS-tracked tag), manage a device, and track a device by logging into the application. By searching for a device, the user can manage and track the device. By requesting location of the device, the user can track the device.

TABLE 1

External user's interaction with the application according to the current invention.

| Use Case | External user interaction |
|---|---|
| Actors | External User |
| Operations | DoLogin( ), Register |
| Description | 1. External user can register user information and create account in the application |
| | 2. Already registered user can login and add device and manage already registered devices. |
| | 3. User can search device by device ID and/or item on which device is attached. |
| | 4. User can track particular device and location will show on computer-based map. |

Figure 2B:
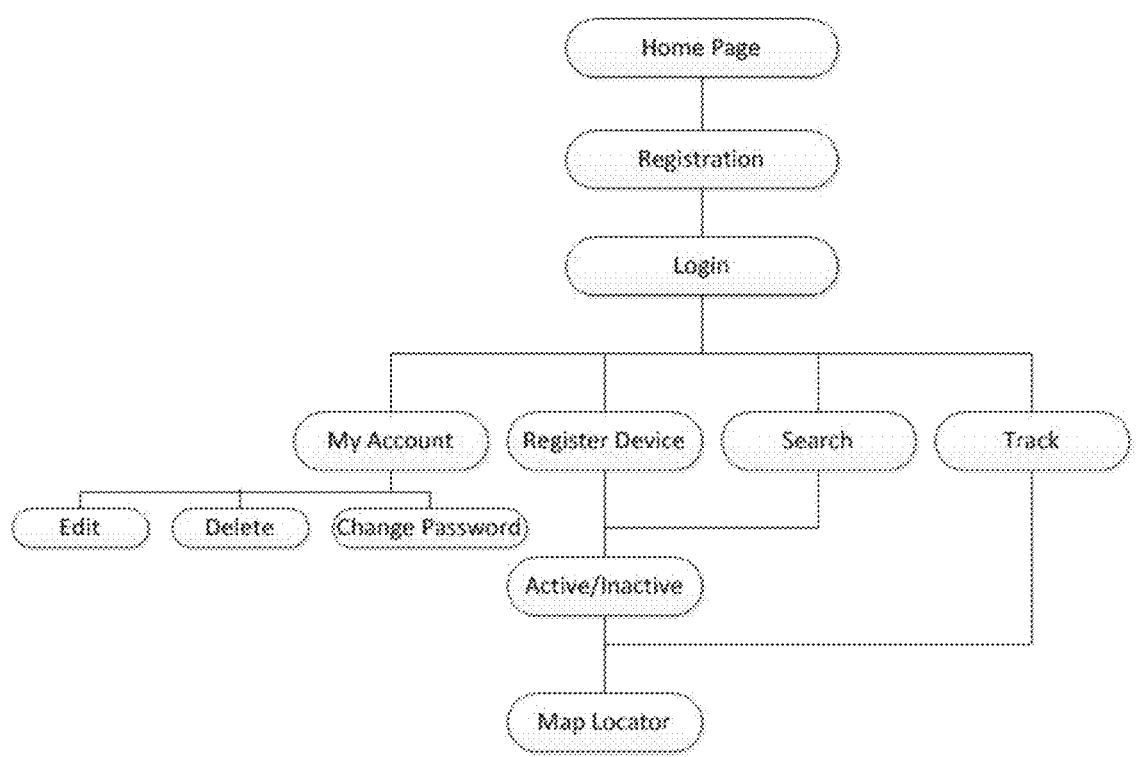
FIG. 2B is a step-by-step flowchart of user interactions according to an embodiment of the current invention.

FIG. 2B is a flowchart showing the step-by-step process of a user's interaction with the application according to an embodiment of the current invention. Once registered, a user logs into the application, where the user can visit the user profile and edit or delete the account or change password for authentication. The user can also register a device with tag, activate/inactivate the tag, and locate the tag on a map. The user can also search for a device with tag, activate/inactivate the tag, and locate the tag on a map. The user can also track a device with to and locate the tag on a map.

Figure 3A:
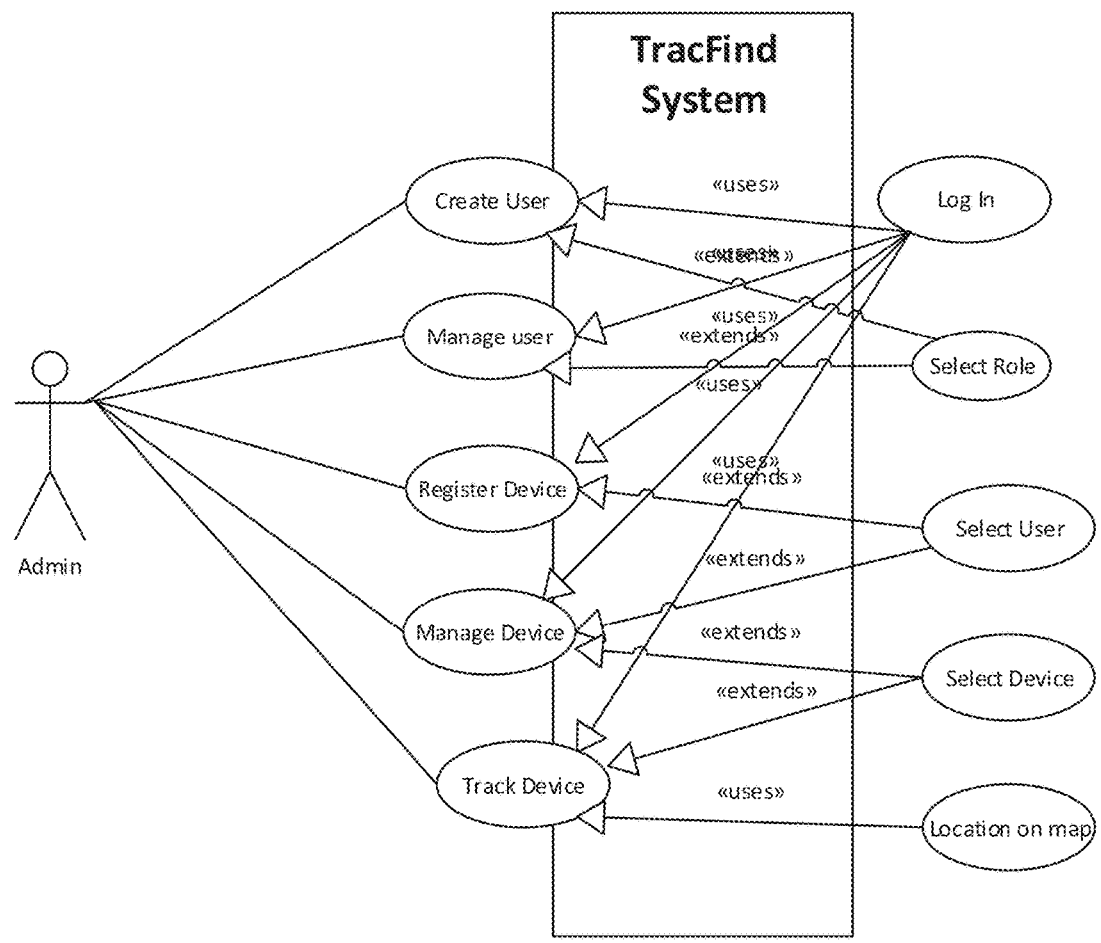
FIG. 3A depicts an interface layer between an administrator and an application according to an embodiment of the current invention.

FIG. 3A depicts an interface layer between an administrator and the computer-based application. By logging into the application, the administrator can create a user, manage a user, register a device (with attached GPS-tracked tag), manage a device, or track a device. An administrator can also select roles of the user, for example as an external user or administrator, by creating the user or managing the user. By selecting a user, the administrator can register a device or manage a device. By selecting a device, the administrator can manage the device or track the device. By requesting location of the device, the administrator can track the device.

TABLE 2

Administrator's interaction with the application according to the current invention.

| Use Case | Administrator interaction |
|---|---|
| Actors | Admin |
| Operations | DoLogin( ) |
| Description | 1. Admin will login and can create user with specific role. |
| | 2. Admin can also manage information of any existing user. |
| | 3. Admin can register new device under any user or manage any device information. |
| | 4. Admin can search any device by device ID, user, and item on which device is attached. |
| | 5. Admin can track device and location will show on computer-based map. |

Figure 3B:
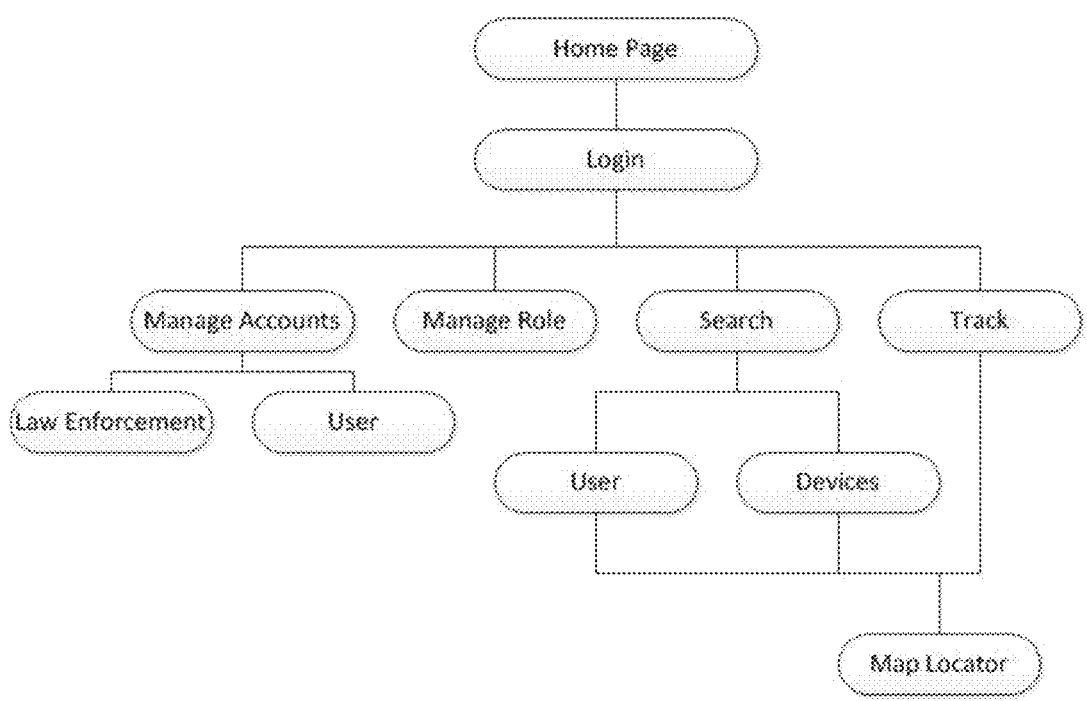
FIG. 3B is a step-by-step flow chart of administrator interactions according to an embodiment of the current invention.

FIG. 3B is a flowchart showing the step-by-step process of an administrator's interaction with the application according to an embodiment of the current invention. Once the administrator logs into the application, the administrator can manage the account of any external user or authorized third party (e.g., law enforcement). The administrator can also manage the roles of any user or of the administrator. The administrator can also search for a user or device with tag, either of which can lead to the location of the tag on a map. The administrator can also track a device with tag and locate the tag on a map.

Figure 4:
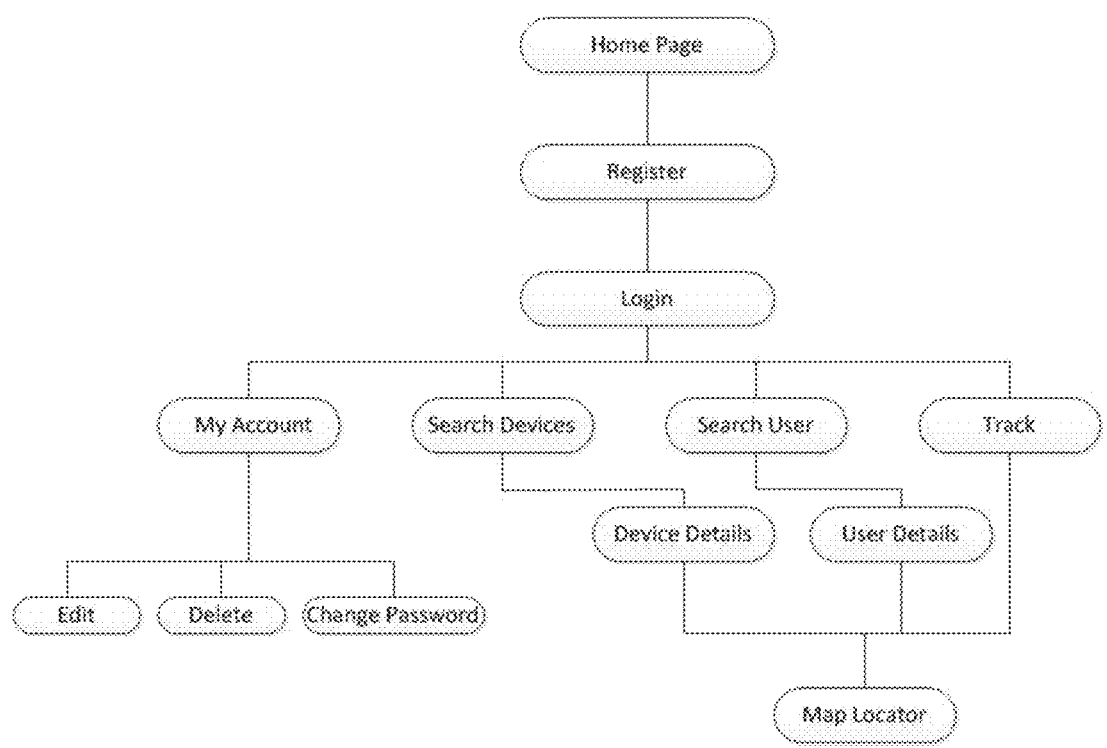
FIG. 4 is a step-by-step flow chart of interactions of an authorized third party, according to an embodiment of the current invention.

FIG. 4 is a flowchart showing the step-by-step process of the interaction between an authorized third party (TP) (e.g., law enforcement personnel) and the application according to an embodiment of the current invention. Once registered, a TP logs into the application, where the TP can visit the TP profile and edit or delete the account or change password for authentication. The TP can also search for a device with tags, obtain details about the device, and locate the tag on a map. The TP can also search for a registered user, obtain details about the user, and locate one of the user's tags on a map. The TP can also track a device with tag and locate the tag on a map.

In an embodiment, the software included in the current invention would run on a non-transitory, tangible medium. The system can break down into types, instances, attributes, and operations or methods according to this embodiment of the invention. For example, classes can include the possible roles of users, user information stored in the application, tag information, device information, login controllers, device controllers, among other aspects of the software application.

Figure 5A:
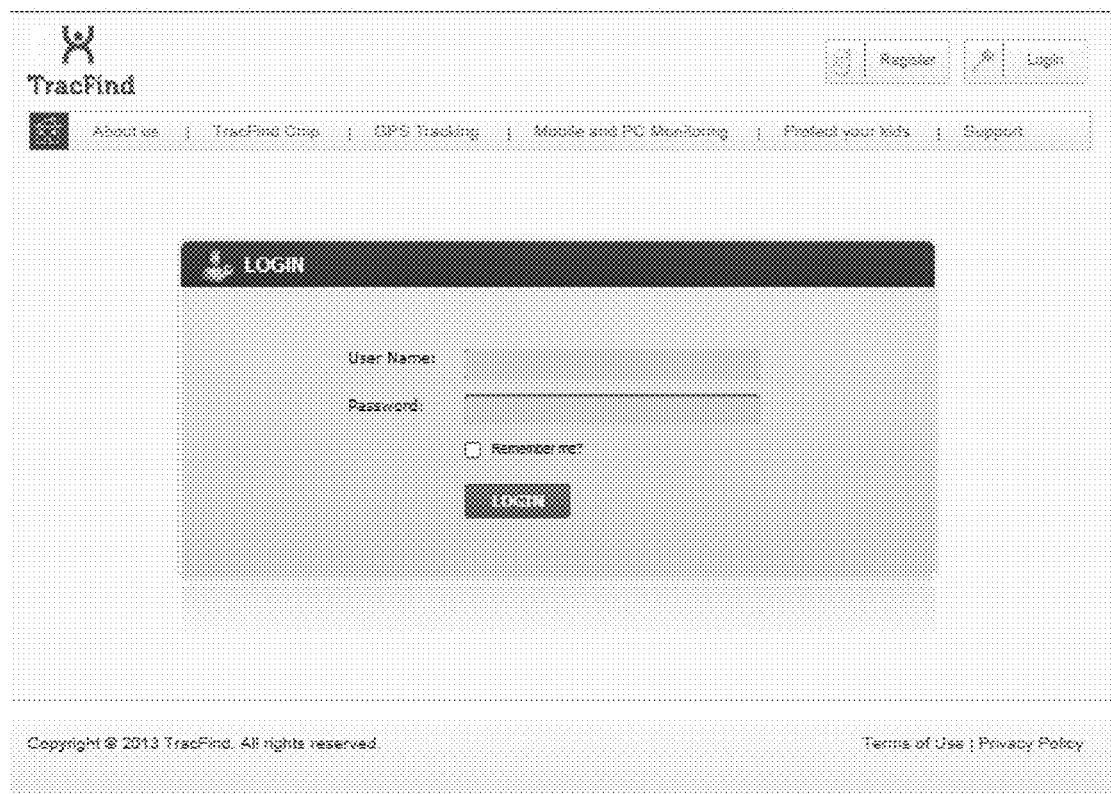
FIG. 5A is a screenshot of an exemplary login page according to an embodiment of the current invention.

FIGS. 5A-5E are exemplary screenshots of the application according to an embodiment of the current invention. FIG. 5A is a login page, which allows different users to be authenticated and granted access for interaction with the application according to their assigned role.

Figure 5B:
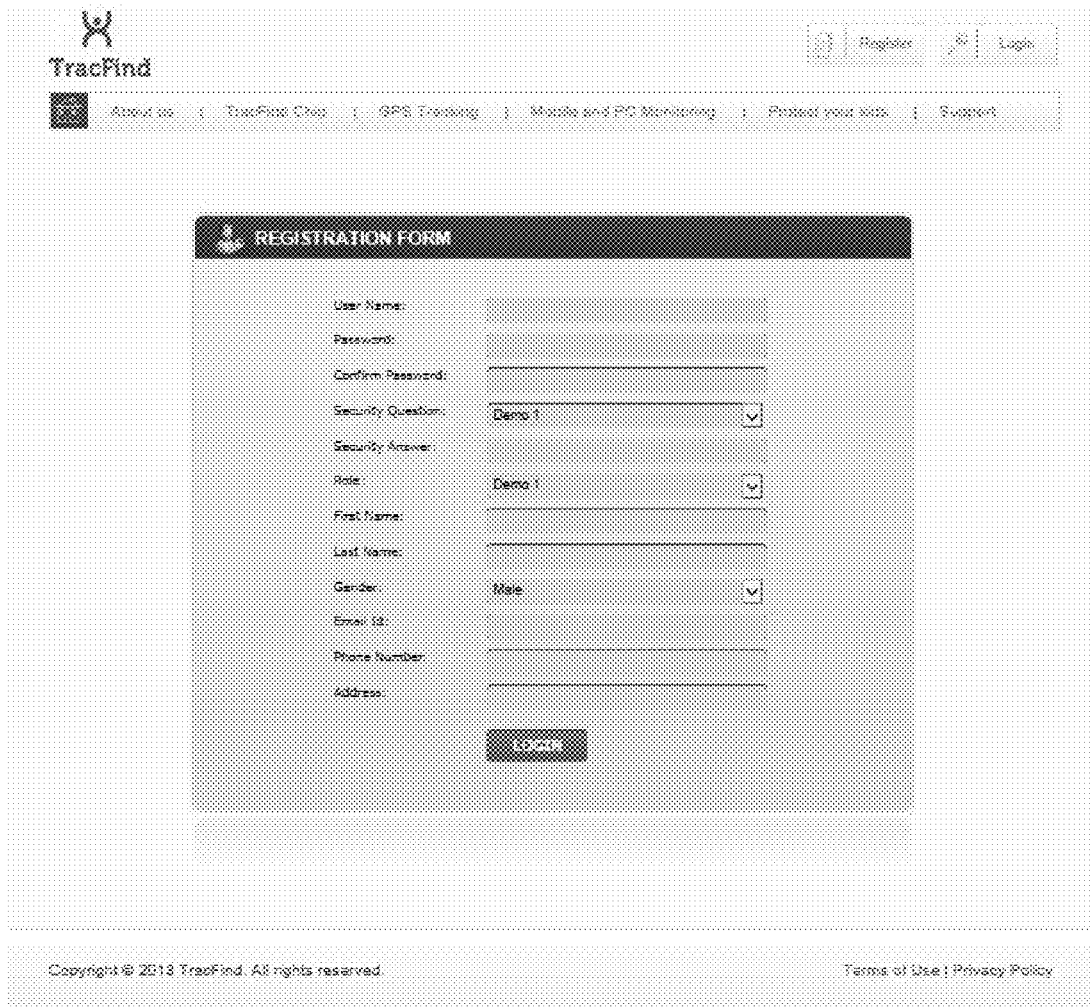
FIG. 5B is a screenshot of an exemplary user registration page according to an embodiment of the current invention.

FIG. 5B is a user registration page for a user to input user-related information, such as name, address, role, gender, etc.

Figure 5C:
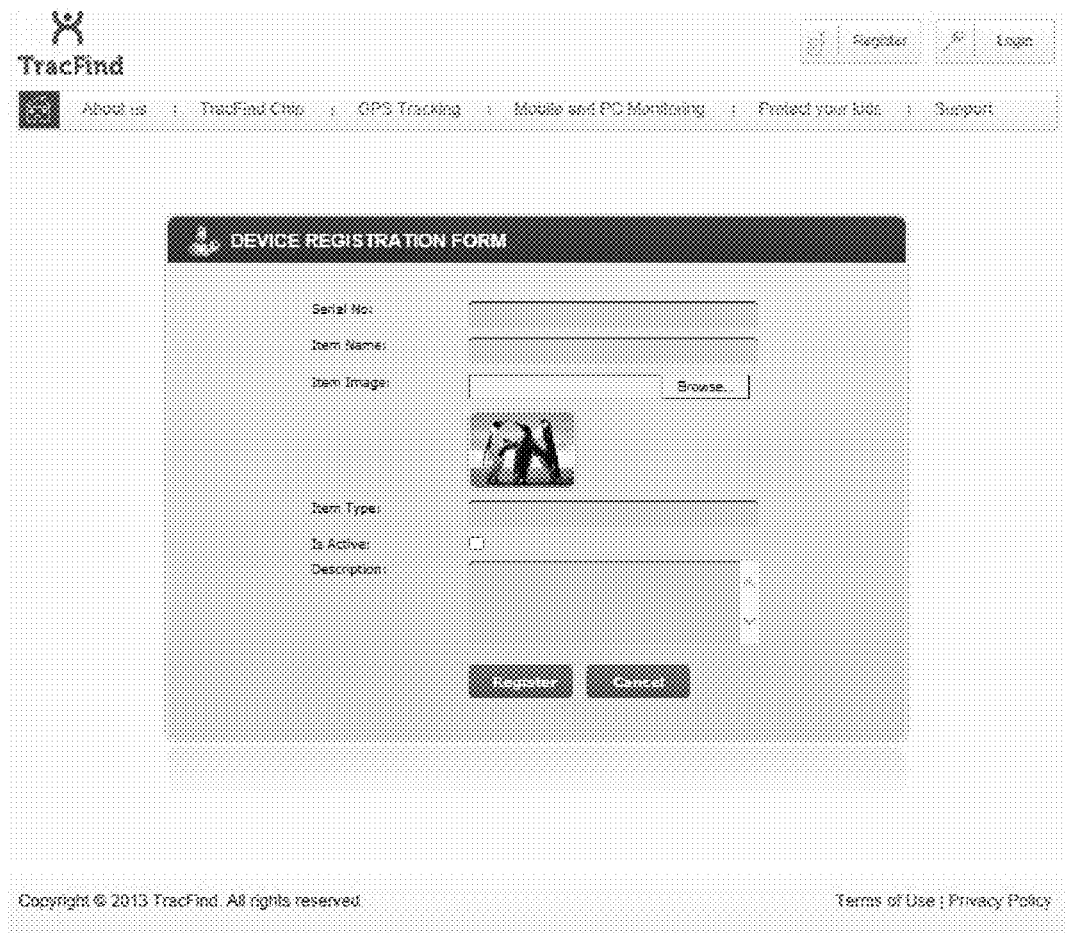
FIG. 5C is a screenshot of an exemplary device registration page according to an embodiment of the current invention.

FIG. 5C is a device registration page for registering a device with tag. Information needed for input may include device identification, associated item type, serial number, etc., along with selection of the inactive or active mode of the tag. Special rules may also apply, for example automatically activating a tag at certain times of the day.

Figure 5D:
FIG. 5D is a screenshot of an exemplary device listing page according to an embodiment of the current invention.

FIG. 5D shows a list of registered devices as registered by a user. The list also shows the associated device type (e.g., phone, wallet, guitar, laptop computer, etc.). The user can search for the device or tag by device identification, name of associated device type, status of tag/device as active or inactive, etc. From this page, the user can also activate or deactivate a tag. Once the user begins tracking the device, the application interacts with the WCF service library that is used for communication with the tag and saving tag/device information into the database.

Figure 5E:
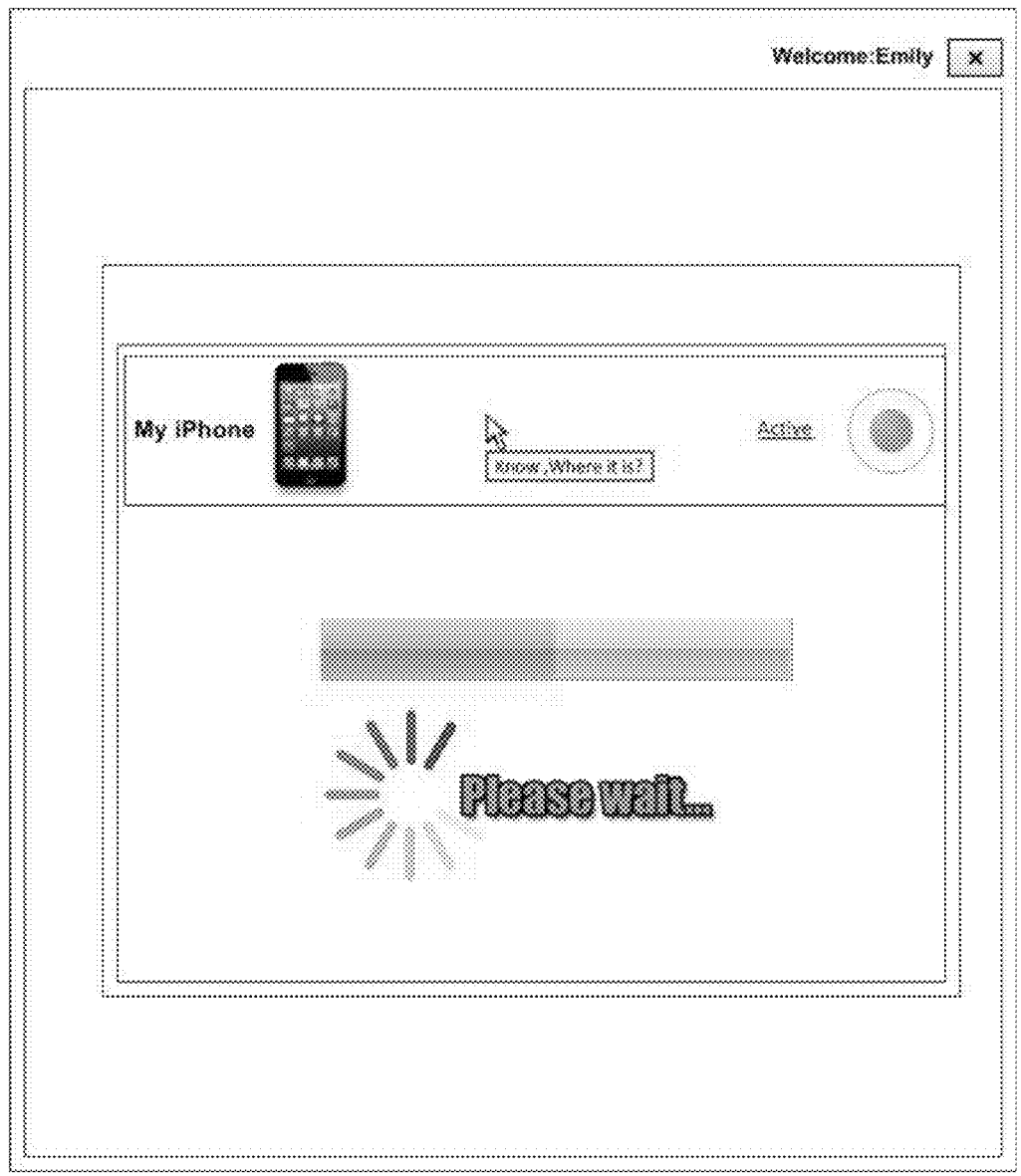
FIG. 5E is a screenshot of an exemplary processing request and completion status page according to an embodiment of the current invention.

FIG. 5E is a holdover page for when the application is sending signals to and receiving signals from the tag through the server. This page may have a status indicator bar of information transmission until completion. This screen may appear when the user processes a request of the tag/device.

Figure 5F:
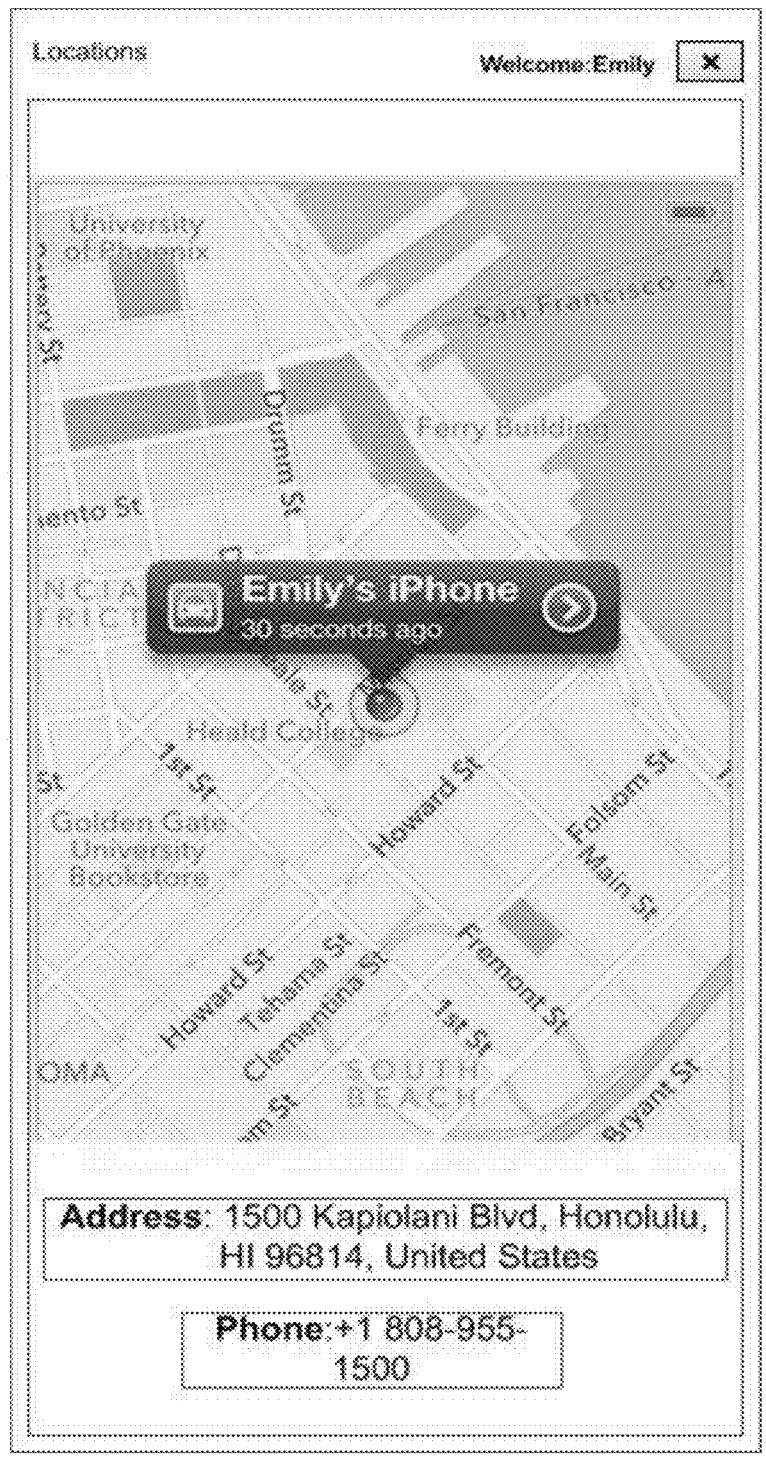
FIG. 5F is a screenshot of an exemplary device locator page according to an embodiment of the current invention.

FIG. 5F is a device locator page that shows the location of the device search. This page may include any location information, for example latitude and longitude, address, phone number, etc.

Figure 5G:
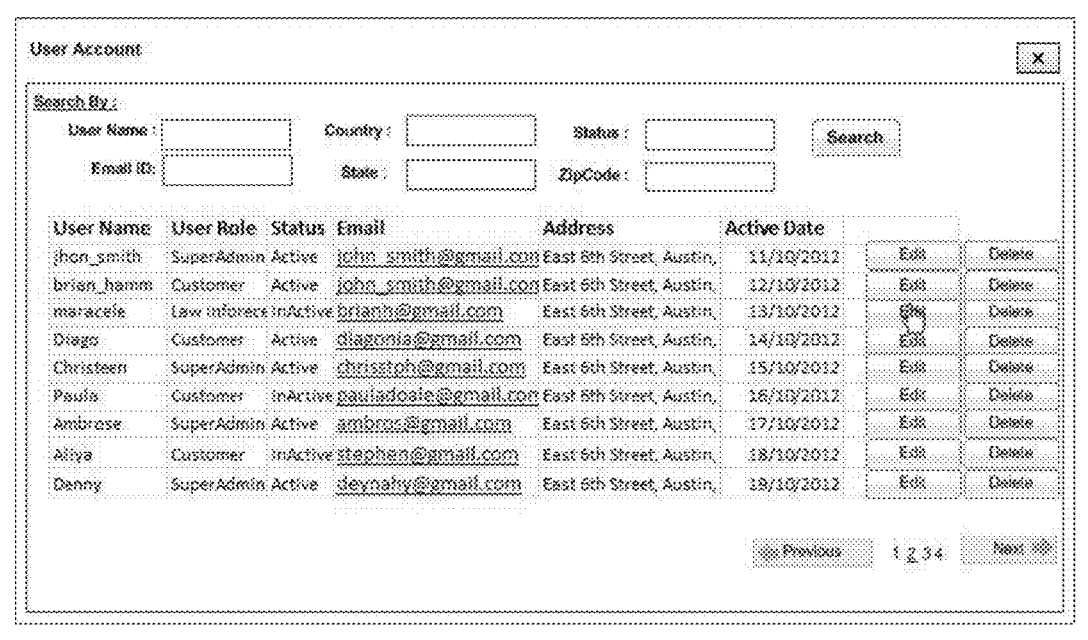

FIG. 5G shows a listing of users as may appear for an administrator. Appropriate information is displayed, for example name, role, status, email address, mailing address, activation date, etc. From this page, an administrator or authorized third party (e.g., parents overlooking their children's accounts) may edit or delete the account and may search users through any criteria, such as name, email address, country, state, status, zip code, etc. Various paging functionalities for navigating through different pages of the list is contemplated.

FIG. 5H is a page that may appear to an authorized third party, such as law enforcement personnel. This particular page shows a listing of tags and associated devices belonging to a single user. The authorized third party can perform searches of a user or device by searching user name, device identification, status, device name, etc. The authorized third party can then trace the device with tag to ensure proper location.

Any suitable tags and chipsets may be utilized with the current invention. For example, the tag may be the SKORPA TELEMETRY SnapTrax Logger, SKORPA TELEMETRY Communicator GPS MicroTraX Tags, SKORPA TELEMETRY Voyager GPS MicroTraX Tags, SKORPA TELEMETRY Pathfinder GPS MicroTraX Tags, and SKORPA TELEMETRY SnapTraX Solar, which are all incorporated herein by reference. The chipsets may be manufactured by RAKON, IRIDIUM LIMITED, DIAMOND POINT INTERNATIONAL, ROCKWELL COLLINS, RF SOLUTIONS LTD., and SEMICONDUCTOR STORE, all of which have chipsets that are incorporated herein by reference. However, as is indicated, a variety of tags, microchips, and chipsets may be suitable for incorporation of various embodiments of the current invention.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of tracking an asset, comprising:
   attaching a transceiver to the asset, wherein the transceiver is configured for wireless communication;
   registering the transceiver with a server using a computer-based application;
   transmitting by a computer-based device from which the application is accessed, in response to an input from a user a first signal to the server, wherein the first signal contains a query for a location information of the transceiver;
   transmitting by the server, in response to the first signal, a second signal to the transceiver;
   transmitting by the transceiver in response to the second signal, a third signal containing location information of the transceiver to the server;
   extracting by the server in response to the third signal the location information from the third signal;
   transmitting by the server the location information to a database that automatically records the location information;
   simultaneously with said transmitting of the location information, converting by the server the location information into a particular language-based response that is displayable in a map generated by the computer-based device, and
   when the asset is missing or lost, allowing the database that recorded the location information to be immediately accessible by a law enforcement agency.

2. The method of claim 1, further comprising:
   receiving by the computer-based device the location information; and
   displaying by the computer-based device a location of the asset on the map.

3. The method of claim 1, wherein the server and the transceiver communicate over a wireless communication network.

4. The method of claim 1, further comprising:
   receiving by a global positioning satellite (GPS) the second signal transmitted by the server; and
   relaying by the GPS the second signal to the transceiver.

5. The method of claim 1, further comprising:
   receiving by a global positioning satellite (GPS) the third signal transmitted by the transceiver; and
   relaying by the GPS the third signal to the server.

6. The method of claim 1, wherein the location information includes latitude and longitude of the transceiver.

7. The method of claim 1, wherein the transceiver is registered with the computer-based application by providing a serial number associated with the transceiver.

8. The method of claim 1, wherein the transceiver is embedded in a tag attachable to the asset.

9. The method of claim 1, wherein the application is accessed by the user via user authentication.

10. The method of claim 1, wherein the user is a third party authorized by the owner of the asset to access the application to track the asset.

11. The method of claim 1, wherein the transceiver is automatically activated at certain times of a day based on a user defined rule.

12. The method of claim 1, wherein the application is hosted by the server and accessed remotely.

13. The method of claim 1, wherein the application resides in a computer configured to communicate with the server over the Internet.

14. A system for tracking an asset, comprising:
   a transceiver attached to the asset and configured for wireless communication; and
   a computer-based application configured to enable access to a database upon authentication and to enable registration of the transceiver with a server;
   wherein a map generated by a computer-based device, from which the computer-based application is accessed, displays a location of the transceiver, the application further configured to transmit a first signal to the server using the computer-based device in response to an input from a user, the first signal containing a query for a location information of the transceiver, the application further configured to receive the location information from the server using the computer-based device, the location information being converted by the server into a particular language-based response that is displayable in the map generated by the computer-based device simultaneously with the server transmitting the location information to the database, and allow the database that recorded the location information to be immediately accessible by a law enforcement agency when the asset is missing or lost.

15. The system of claim 14, wherein in response to the first signal, the server transmits a second signal to the transceiver, and wherein, in response to the second signal, the server receives from the transceiver a third signal containing location information of the transceiver.

16. The system of claim 14, wherein the server and the transceiver communicate over a wireless communication network.

17. The system of claim 14, wherein the location information includes latitude and longitude of the transceiver.

18. The system of claim 14, wherein the transceiver is registered with the computer-based application by providing a serial number associated with the transceiver.

19. A computer program product for tracking an asset, wherein the computer program product comprises code embodied on a non-transitory computer-readable medium and configured so as when executed cause a data processing system to perform steps of:

accessing a server over a communication network;

registering a transceiver attached to the asset with the server;

transmitting in response to an input from a user a first signal to the server, the first signal containing a query for a location information of the transceiver;

receiving from the server the location information;

displaying in a map generated by the data processing system a particular language-based response that is converted from the location information by the server simultaneously with the server transmitting the location information to a database; and when the asset is missing or lost, allowing the database that recorded the location information to be immediately accessible by a law enforcement agency.

20. The computer program product of claim 19, wherein in response to the first signal, the server transmits a second signal to the transceiver, and wherein in response to the second signal, the transceiver transmits a third signal containing location information of the transceiver to the server.

21. The computer program product of claim 20, wherein the server extracts the location information from the third signal and transmits the location information to the data processing system.

* * * * *